(12) United States Patent
Doyle et al.

(10) Patent No.: US 6,567,185 B1
(45) Date of Patent: May 20, 2003

(54) DATA ACQUISITION AND RETRIEVAL SYSTEM FOR AN IMAGE REPRODUCING SYSTEM

(75) Inventors: David R. Doyle, Victor, NY (US); Mark J. Blejwas, Macedon, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/346,631

(22) Filed: Jul. 1, 1999

(51) Int. Cl.[7] .............................................. G06F 15/00
(52) U.S. Cl. ................... 358/1.16; 358/1.12; 358/1.15; 399/77
(58) Field of Search ................ 358/1.12, 1.15, 358/1.16; 399/77, 83, 84; 360/75, 81, 77.01, 240, 237, 236.9, 78.01; 400/521, 525

(56) References Cited

U.S. PATENT DOCUMENTS

| | | | |
|---|---|---|---|
| 5,081,595 A | * | 1/1992 | Moreno et al. ............ 358/1.12 |
| 5,243,381 A | | 9/1993 | Hube .......................... 355/204 |
| 5,326,179 A | * | 7/1994 | Fukai et al. ................. 400/521 |
| 5,452,068 A | | 9/1995 | Farrell ......................... 355/321 |
| 5,452,151 A | * | 9/1995 | Money et al. ................. 360/75 |
| 5,521,774 A | | 5/1996 | Parks et al. .................... 360/81 |

* cited by examiner

Primary Examiner—Mark Wallerson
Assistant Examiner—Twyler Lamb
(74) Attorney, Agent, or Firm—Fay, Sharpe, Fagan, Minnich & McKee, LLP (57) ABSTRACT

A data access and retrieval system is used with an image reproducing system for accessing and retrieving data from a hard disk set using multiple head assemblies. The head assemblies are separate from each other and are disposed so as to independently read or write image data to the same hard disk set. The head assemblies form multiple data pathways between a system bus and the hard disk set, thus allowing for separate independent access thereto.

17 Claims, 4 Drawing Sheets

DATA ACQUISITION AND RETRIEVAL SYSTEM FOR AN IMAGE REPRODUCING SYSTEM

BACKGROUND OF THE INVENTION

The present invention relates to an image reproducing system, and more particularly relates to an image data handling and storage facility for use in the image reproducing system.

Today, electrophotographic printing systems, such as digital copiers, are widely used in many business and commercial environments. In a digital copier, an image of a document is captured by an input scanning facility, and converted into selected digital image data. This image data is then typically compressed by a control unit, then either forwarded to a suitable printing module, or stored in system memory. In conventional systems, the compressed image data is stored in random access memory (RAM) devices, such as DRAM, for subsequent access by the control unit. Hence, the DRAM provides a suitable and easily accessible memory element that allows for the essential real time storage of image data. A drawback of storing the digital image data in this type of memory, however, is that it is expensive relative to other, cheaper memory devices, such as a hard disk.

Standard disk drive assemblies mounted in electrophotographic copiers employ a single set of read/write heads in connection with a stack of hard disks. In this arrangement, only a single data operation can be formed on the disks at a time. For example, the copier either writes information to the hard disk via the read/write heads, or reads information from the disk via the read/write heads. Hence, the access and retrieval of image data stored on a hard disk drive assembly is relatively slow when compared to other system memory devices, such as DRAM. Moreover, there are certain latent time delays associated with the mechanical operation of the disk assembly, such as track seeking time and other known time delays, that contribute to the relatively slow data access and retrieval from the hard disk. Hence, traditional image reproducing systems employ disk drive assemblies that only provide a single data path to and from the hard disk, while concomitantly employing relatively expensive memory in which to store the digital image data.

Hence, there still exists a need in the art for an improved image reproducing system that can process and store image data in a cost efficient manner. In particular, an image reproducing system that decreases costs associated with the storage of digital image data would represent a major improvement in the art. Additionally, an image reproducing system that provides for relatively easy and efficient access to a relatively low cost data storage element would also present a major improvement in the art.

The invention will next be described in connection with certain preferred embodiments. However, it should be clear that various changes and modifications can be made by those skilled in the art without departing from the spirit and scope of the invention.

SUMMARY OF THE INVENTION

The present invention provides a system for accessing and retrieving data from a hard disk set using multiple head assemblies. The head assemblies form multiple data pathways between a system bus and the hard disk, thus allowing for separate independent access to the hard disk set.

This invention thus attains certain selected objects of the invention with an image reproducing system that includes an image acquisition element for acquiring image data representative of an image of an object, one or more disk storage elements, and first and second disk head assemblies that are disposed to read or write image data to the disk storage element. The first disk head assembly is separate from the second disk head assembly and is disposed so as to independently read or write image data to a selected portion of the same disk storage element. According to one practice, the image acquisition element can include a digital scanner for acquiring and digitizing the image data. According to another practice, the image acquisition element can include a digital acquisition assembly for acquiring the image data. The assembly can include a light source for illuminating a portion of the object, a plurality of photosensitive elements positioned to receive light reflected from the object, and a digital converter for converting electrical output signals generated by the photosensitive elements into output digital signals.

According to one aspect, the system forms a first data pathway between the disk storage element and a system data pathway, such as a bus, with the first head assembly for communicating the data image to and from the disk storage element. The system also forms a second data pathway separate from the first data pathway with the second disk head assembly for communicating the image data to and from the storage element.

According to another aspect, the image reproducing system further includes a first disk controller coupled to the first disk head assembly for controlling operation thereof, and a second disk controller coupled to the second disk head assembly for controlling operation thereof. Each of the first and second disk assemblies include a plurality of read/write heads, which are disposed so as to communicate with at least one side of each of the storage elements.

According to another aspect, the first and second disk head assemblies employ structure for positioning the read/write heads relative to the storage element to perform a selected data operation, such as read image data from or write image data to the storage element.

According to still another aspect, the image reproducing system further comprises a printer module arranged for receiving selected data associated with the image data previously stored on the storage element for generating a copy of the image.

The present invention also provides for a dual data pathway image reproducing system for acquiring an image of an object. The system includes an image acquisition element for acquiring image data, one or more disk storage elements, a first disk head assembly disposed so as to read said image data from or write said image data to a selected portion of the disk storage element, and a second separate disk head assembly disposed so as to read the image data from or write the image data to a selected portion of the disk storage element. The first and second disk head assemblies are configured for independently reading or writing the image data relative to the same disk storage element so as to form multiple separate data paths to and from the storage element.

According to one aspect, the image reproducing system includes a first disk controller coupled to the first disk head assembly for controlling operation thereof, and a second disk controller coupled to the second disk head assembly for controlling operation thereof. Each of the first and second disk head assemblies includes a plurality of read/write heads disposed so as to communicate with at least one side of each of the disk storage elements.

According to another aspect, the image reproducing system includes a printer module for receiving selected data associated with the image previously stored on the storage element, and for generating a copy of the image.

The present invention further provides for a method of reproducing an image of an object, comprising the steps of acquiring image data representative of an image of the object, disposing a first disk head assembly relative to a storage element so as to read or write image data relative to a selected portion of the disk storage element, and disposing a second disk head assembly separate from the first disk head assembly so as to independently read or write image data relative to a selected portion of the same disk storage element.

According to one aspect, the method includes the step of communicating the image data to and from the disk storage element along a first data pathway disposed in communication with the first disk head assembly, and communicating the image data to and from the storage element along a second data pathway disposed in communication with the second disk head assembly, thereby forming multiple data paths for the transfer of image data to and from the storage element.

According to another aspect, the method includes the steps of controlling operation of the first disk head assembly with a first disk controller, and controlling operation of said second disk head assembly a second disk controller, such that the first and second controllers control the transfer of the image data to and from the storage element.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

Figure 1:
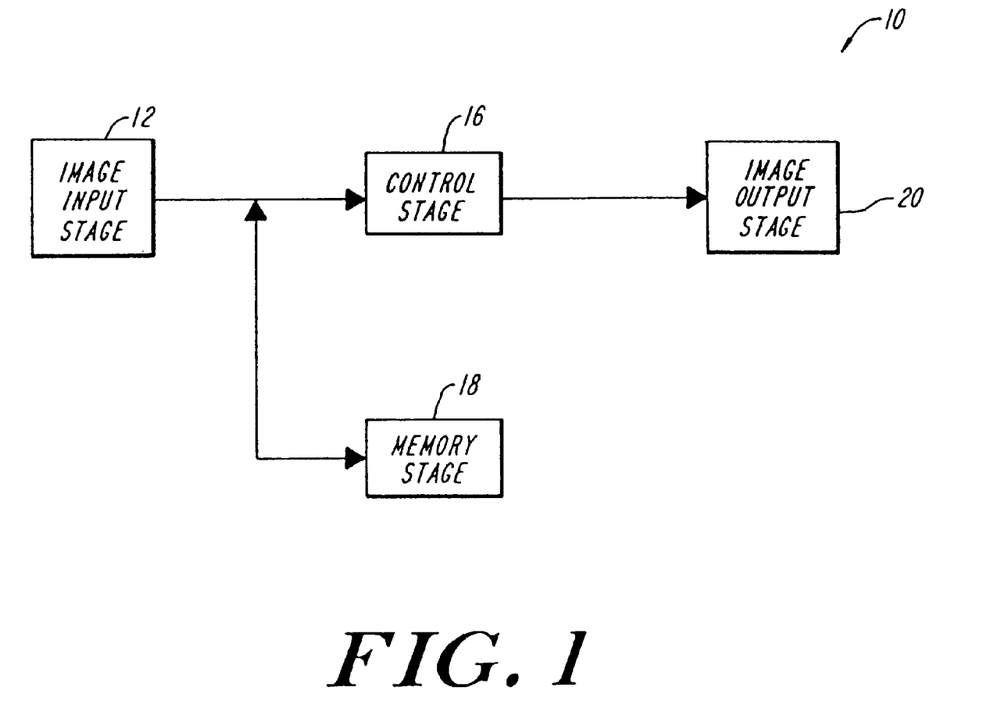
FIG. 1 is a schematic block diagram of an image reproducing system suitable for employing a data storage and retrieval system in accordance with the teachings of the present invention.

The present invention provides for an efficient, cost effective manner of storing image data in an image forming or reproducing system with a data access and retrieval system. The system of the present invention can be employed in a number of different types of image reproducing systems, examples of which include electrophotographic, electrostatic, ionographic, and other types of image forming or reproducing systems, that are adapted to capture and/or store image data associated with a particular object, such as a document. The system 100, FIG. 4, of the present invention is intended to be implemented in a variety of environments, such as in any of the foregoing types of image reproducing systems, and is not limited to the specific systems described herein. One broad example of a general image forming or reproducing system suitable for employing the data access and retrieval system of the invention is illustrated in FIG. 1. The illustrated image reproducing system 10 includes an image input stage 12 that is adapted to acquire or receive an image of a document. The image data associated with the acquisition of the document image is then transferred to either or both a control stage 16 and a memory stage 16. The memory stage 18 can include any suitable memory module adapted for storing the image data, examples of which include RAM, ROM, and the like, and preferably includes one or more hard disks. The control stage 16 includes an arrangement for controlling the retrieval from or transfer to of image data in the memory stage 18, as well as controlling the transfer of image data to an image output stage 20. The illustrated image output stage 20 can include any suitable apparatus for reproducing the image on a substrate, such as a conventional printer or copier, both of which are known and well characterized in the art.

The present invention is particularly directed to the use of an improved data storage and retrieval system for transferring image data to and/or retrieving image data from a relatively low cost memory medium, which forms part of the image reproducing system 10. For the sake of simplicity and clarity, the data access and retrieval system 100, FIG. 4, will be described in connection with its use in an image printing system, such as the electrophotographic printing system of FIG. 2, although uses in other systems and environments are also contemplated by the present invention.

Figure 2:
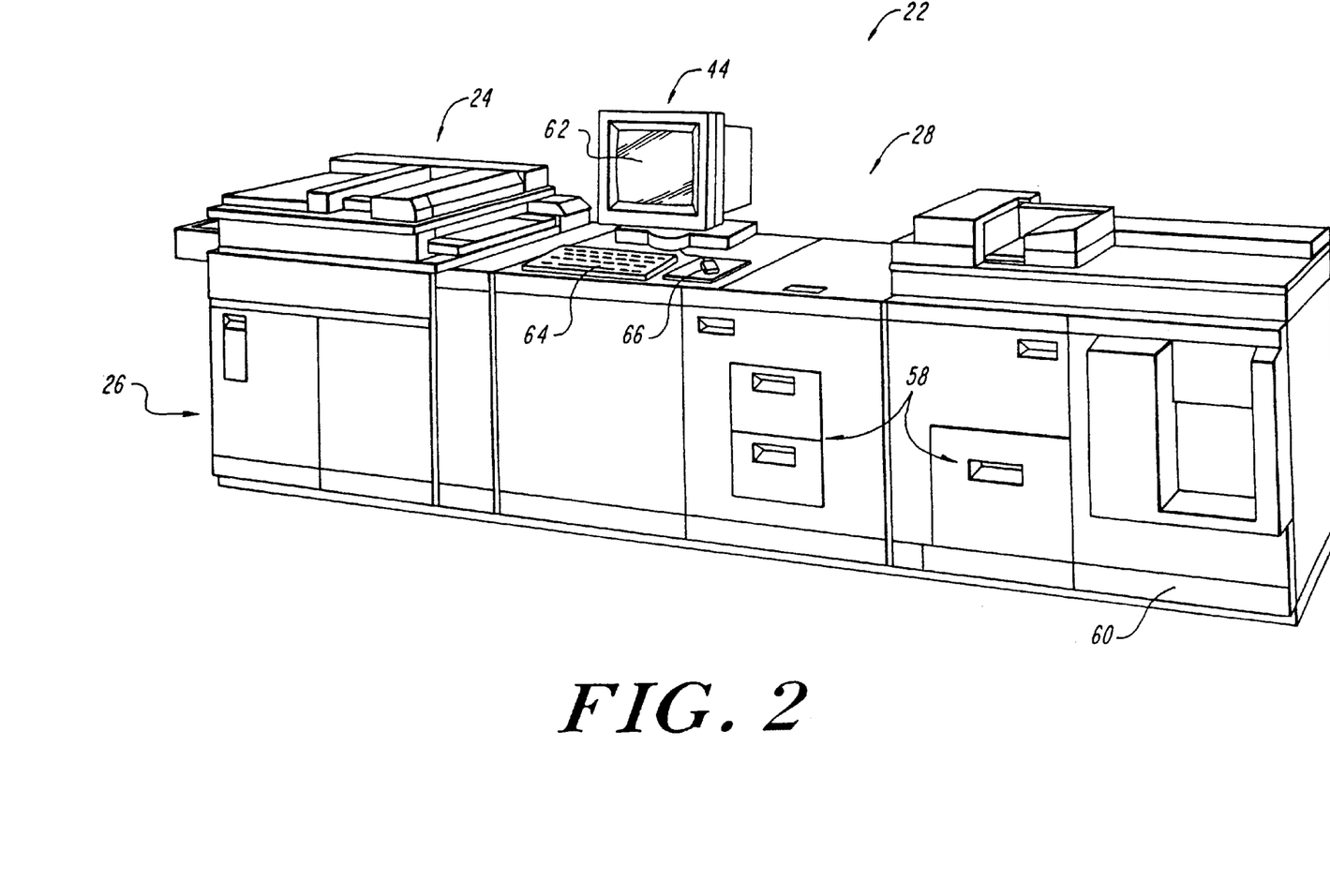
FIG. 2 is a perspective, schematic view of an electrophotographic printing system suitable for employing the data storage and retrieval system in accordance with the teachings of the present invention

FIG. 2 is a perspective view of a general electrophotographic printing system, such as a digital copier, that employs the data access and retrieval system 100 according to the teachings of the present invention. The illustrated printing system 22, for purposes of explanation, can be divided into multiple sections according to functionality, such as into the image input stage 24, control stage 26, and a printer stage 28. In the illustrated printing system 22, the image input stage 24 can include both local (e.g., on-site) and remote image inputs, thus enabling the printing system 22 to provide network, scan, and print services in a single integrated system. Other system combinations and arrangements can also be employed in the printing system 22 and would be obvious to the ordinarily skilled artisan, such as a stand alone printing system with on-site image input (i.e., a scanner), controller, and printer assemblies; a network printing system with remote input, controller, and printer assemblies; and like system configurations.

While a specific printer stage 28 is shown and described in the exemplary printing system 22, the present invention also contemplates using other types of printing systems. For example, the printer stage 28 can instead employ an ink jet printer, an ionographic printer, a thermal printer, a photographic printer, etc. Furthermore, imaging functions of the printer section 28 can be incorporated in electronic display systems, such as CRTs, LCD's, LED's, or other like image scanning, processing, or recording systems, or alternatively, other signal transmitting, receiving and recording systems.

Figure 3:
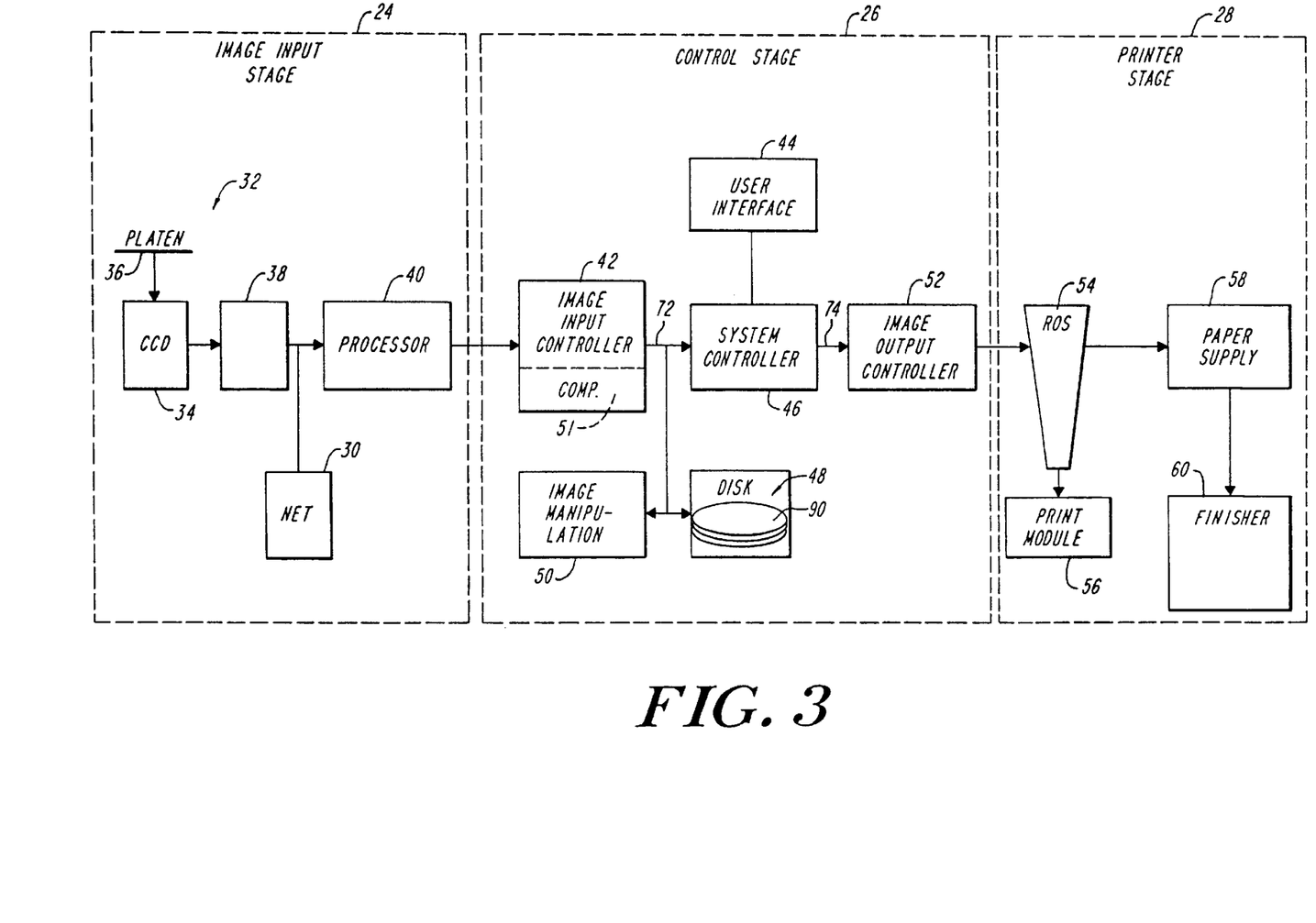
FIG. 3 is a schematic block diagram depicting the major components of the printing system of FIG. 2.

With reference to FIGS. 2 and 3, for remote or off-site acquisition or inputting of image data into the printing system 22, the image input stage 24 can include a network interface 30 with a suitable communication channel, such as a telephone line, enabling image data in the form of image signals or pixels to be inputted or introduced to the image input stage 24 from one or more remote sources for processing. Other remote sources of image data such as streaming tape, floppy disk, video camera, and the like are also contemplated by the present invention.

For on-site image input, the image input stage 24 includes a scanner 32 that can employ a universal or automatic document handler (not shown) for the purpose of automatically and sequentially placing and locating documents for scanning. Conversely, a manual mode document mode and/or a Computer Forms Feeder (CFF) mode can also be provided, the latter to accommodate documents in the form of computer fanfold. The scanner 32 can incorporate one or more linear light sensitive or photoelectric arrays 34, such as the illustrated charge-coupled device (CCD), for reciprocating scanning movement below a glass platen 36. Light reflected from the document on the platen 36 is focused by an associated optical arrangement onto the photoelectric array 34, which produces electric output image signals. Hence, the photoelectric array 34 provides image elemental signals (or pixels) representative of the image scanned by the scanner 32. These signals are introduced to a digital converter 38 for converting the electric image signals generated by the photoelectric array 34 into digital image signals. The digital image signals are then introduced to a processor 40 for further processing.

The illustrated processor 40 processes the digital image signals generated by the converter 38 as required to enable the control stage 26 to manipulate, store and handle the image data in a form and order required to carry out a user defined function, such as a selected print job. The processor 40 can be configured to enhance or change the image data, such as by filtering, thresholding, screening, cropping, scaling (reduction/enlargement), and the like. Following any changes or adjustments made to the image data, the processor 40 then communicates the image data signals to the control stage 26. Similarly, image signals received via the network connections are conveyed from the network interface 30 to the processor 40, which in turn forwards the image data to the control stage 26.

Referring to FIGS. 1 through 3, and with particular reference to FIG. 3, the control stage 26 is, for explanation purposes, divided into an image input controller 42, user interface (UI) 44, system controller 46, main memory 48, image manipulation section 50, and image output controller 52. The image data outputted by the processor 40 of the image input stage 24 is received by the image input controller 42. The image input controller 42 can include a compression section 51 for compressing the image data with a compressor or processor. The compression section 51 can be adapted to segment the image data as it passes therethrough into slices N scanlines wide, each slice having a slice pointer. The compressed image data together with the slice pointers and any related image descriptors providing image specific information (such as height and width of the document in pixels, the compression method used, pointers to the compressed image data, and pointers to the image slice pointers) are placed in an image file. The image files, which represent different print jobs, can be temporarily stored in system memory 61, which can comprise a Random Access Memory (RAM), and according to an aspect of the present invention, can be stored on a hard disk assembly in accord with techniques described below, where the image data is held pending further use.

The user interface 44 can include a combined operator controller/CRT display consisting of an interactive touch-screen 62, keyboard 64, and mouse 66, FIG. 2. The user interface 44 preferably enables the operator to interface with the printer stage 28, so as to program print jobs and other instructions, and to obtain system operating information, instructions, programming information and icons, diagnostic information, visual document facsimile display and pictorial views, and the like. Items displayed on the touchscreen 62, such as files and icons, are actuated by either touching the displayed item on the screen 62 or by using the mouse 66 to manipulate a cursor 67 to select an item.

Figure 4:
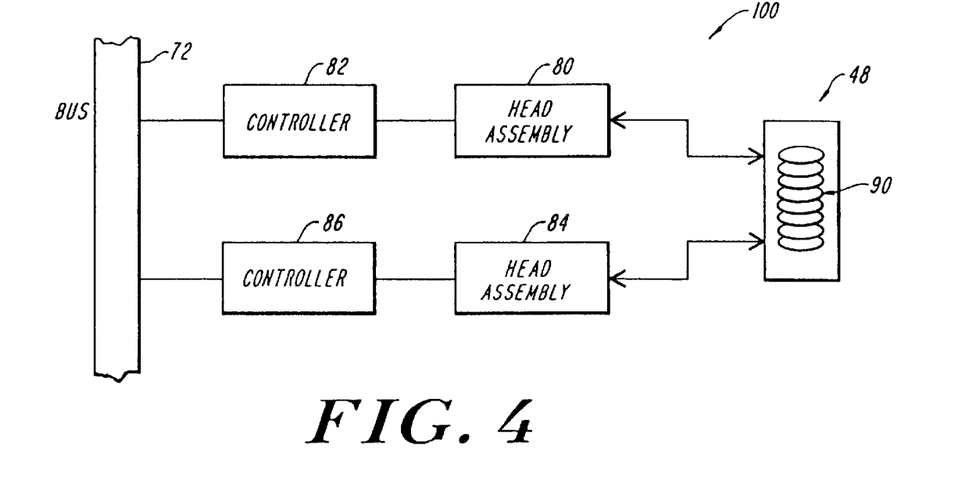
FIG. 4 is a schematic block diagram of the data storage and retrieval system incorporated in the image reproducing system of FIG. 1 or the electrophotographic printing system of FIG. 2.

The main memory 48 in accordance with the teachings of the present invention includes a plurality of head disk assemblies 80 and 84, FIG. 4, that interface with plural hard disks 90 for storing image data captured by the image input section 24, as well as other data known in the art, such as machine Operating System software, machine operating data and the like.

When the image data stored in the main memory 48 requires further processing, the stored data is accessed in the main memory 48 by one or more of the head assemblies 80 and 84. Where processing other than that provided by the processor 40 is required, the image data can be transferred to the image manipulation section 50 where additional processing steps, such as collation, make ready, decomposition, and other operations are carried out. Following processing, the data can be returned to the system main memory 48, sent to the user interface 44 for display on the touchscreen 62, or sent to the image output controller 52. These operations are all performed under the auspices of the system controller 46.

The image data received by the image output controller 52 can be decompressed and readied for printing by associated image generating processors that can form part of the control stage 26, such as by the image output controller 52 or by the system controller 46, or can form part of the printer stage 28. Image data received by the printer stage 28 for printing is normally purged from the main memory 48 in order to provide sufficient memory capacity for new image data received by the control stage 26. As illustrated, the image data is transferred between the various components of the control stage 26 along memory buses 72 and 74.

Referring again to FIGS. 2 and 3, the illustrated printer stage 28 can include a laser type printer, and for purposes of explanation, is separated into a raster output scanner (ROS) section 54, a print module 56, a paper supply section 58, and a finisher stage 60. The ROS section 54 employs a radiation source, such as a laser, that is modulated in accordance with an image signal to provide one or more imaging beams that are scanned across a moving photoreceptor of the print module 56 by any suitable structure, such as by a rotating polygon. This creates a latent electrostatic images on portions of the photoreceptor, which can be subsequently developed by a developer stage in accordance with known techniques, and then transferred to a print media delivered by the paper supply section 58. As will be appreciated by those skilled in the art, the print media can comprise a selected one of various known substrates which are capable of accepting an image, examples of which include transparencies, preprinted sheets, vellum, glossy covered stock, film and the like. The print media can also comprise any of a variety of sheet sizes, types, and colors, and for this, plural media supply trays of the paper supply section 58 can be provided. The developed image transferred to the print media can be permanently fixed or fused and the resulting prints discharged to either an output tray or to the finisher stage 60. The finisher stage 60 provides certain finishing selections such as a stitcher for stitching or stapling the prints together to form books, a thermal binder for adhesively binding the prints into books, and/or other finishing options such as slitting, perforating, saddle stitching, folding, trimming, or the like.

The illustrated system controller 46, or a printer system controller that forms part of the printer stage 28, can be employed to control the printer functions and operations in accordance with selected job program parameters received from the system controller 46 of the control stage 26, as well as from internally derived signals from sensors and processes within the printer stage 28. The user interface 44 allows an operator to define or select the parameters of a job program.

A common disadvantage of conventional electrophotographic systems is that they typically attempt to store image data associated with an object in a random access memory (RAM) device, such as DRAM. This storage medium, however, is generally expensive relative to the storage afforded by other media, such as hard disks. As set forth above, an electrophotographic printing system 22 generally captures an image of an object, and compresses the corresponding image data, such as by using the compressor 51, prior to storage in the main memory 48. The electrophotographic printing system 22 is thus capable of filling megabytes of memory with the acquired image data. For example, an 8.5 inch by 11 inch image that is digitized at 600 by 600 dots per inch, at one bit per pixel, requires over 4.2 million bytes of memory. Even though images are generally compressed by conventional compression algorithms, the amount of memory required to store the compressed image data is still dependent upon the image's amenability to compression. Hence, assuming a 10 to 1 compression ratio, a captured image still requires approximately 0.4 megabytes of memory per image. Thus, if an image of a document having 20 pages is desired, the document can require at least 8 megabytes of storage space for document storage. DRAM is a relatively expensive option for storing the image data. The present invention addresses this problem by employing a hard disk set 90 (e.g., employs multiple hard disks) in the main memory 48, which are inexpensive relative to DRAM, and associated electronics according to the invention in order to provide immediate access and retrieval of image data from the hard disks.

Figure 5:
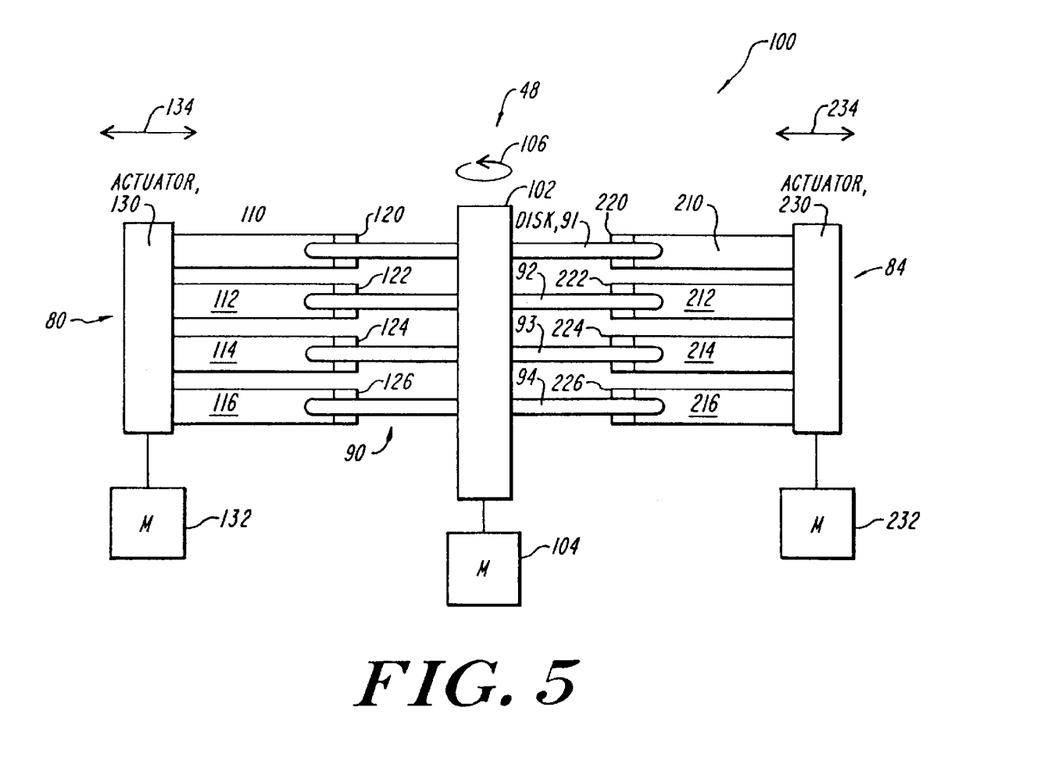
FIG. 5 is a detailed schematic view of the head assembly and disk drive of FIG. 4.

FIGS. 4 and 5 illustrate the data access and retrieval system 100 employed in connection with the electrophotographic printing system 22 for creating multiple data paths between the hard disk set 90 and a system bus, such as bus 72 of the control stage 26. This specific architecture allows easy access and retrieval of image data to and from the hard disk set 90 of the main memory 48. The system 100 can form part of the control stage 26, and specifically can form part of the main memory 48. Those of ordinary skill will readily recognize that the data access and retrieval system 100 can form part of any other appropriate section consistent with the teachings herein.

The illustrated system 100 employs a first head assembly 80 and an associated controller 82 that forms a first data pathway between the bus 72 and the system main memory 48. The system 100 also includes a second head assembly 84 and an associated controller 86 that forms a separate, independent data pathway between the bus 72 and the main memory 48. In particular, the illustrated single hard disk set 90, which includes disk storage elements 91, 92, 93, and 94, are coupled to multiple head assemblies 80 and 84. Those of ordinary skill will readily recognize that the illustrated head assemblies 80 and 84 include all necessary mechanical and electronic components of a typical head disk assembly, other than the hard disk elements and associated hardware.

With reference to FIG. 5, the hard disk set 90 includes a series of stacked disk elements 91, 92, 93, and 94 disposed about a center spindle 102. The spindle is actuated by an associated motor 104 to impart rotational movement to the spindle, and hence to the disk elements. The spindle and motor assembly thus rotate the disk elements about a central axis defined by the spindle 102, as illustrated by arrow 106. Those of ordinary skill will readily recognize that any number of disk elements can be provided in the hard disk set 90, other than the four disk elements shown. Moreover, the disk elements can be of any conventional size, and preferably have relatively small diameters in order to reduce or minimize the track seeking time of the read/write heads of each assembly. Moreover, in order to accommodate data in the form of tiny magnetizations, at least the surface of each disk element is formed of any suitable magnetizable metals alloys, such as aluminum alloys. The disk elements can further include a magnetizable coating or data medium, deposited on this aluminum carrier. Typical coatings can include cobalt and certain feroceramic materials.

The illustrated single hard disk set 90 has directly associated therewith multiple head assemblies, such as the head assemblies 80 and 84. The head assemblies 80 and 84 are preferably identical to each other. The illustrated head assembly 80 employs multiple access arms 110, 112, 114 and 116 which terminate at one end in a series of read/write heads 120, 122, 124, and 126, respectively. The end of the access arms opposite the read/write heads are mechanically fixed or coupled to an actuator 130, which is in turn coupled to a linear or stepper type motor 132. The motor 132 imparts a reciprocating motion to the actuator 130, which converts this movement into a radial movement for moving the access arms and hence the read/write heads 120, 122, 124, and 126 to a specific diametrical location of the disk element, as illustrated by arrow 134. Each of the disk storage elements 91, 92, 93 and 94 can be double sided, and hence capable of storing data on both sides. Consequently, each side of each disk has a read/write head associated therewith.

The illustrated read/write heads 120, 122, 124 and 126 write data to the disk storage elements 91, 92, 93 and 94, or read selected data therefrom. As illustrated in the data access and retrieval system 100, each access arm can generally be defined as including a pair of corresponding radial arms that selectively couple read/write heads to write data to or read data from either side of the disk elements 91, 92, 93 and 94. The illustrated data access and retrieval system 100 reads or writes data to the hard disk set 90 by actuating the spindle motor 104 to position the hard disk at a particular sector and/or track, and the motor 132 is actuated in order to position the read/write heads at a particular sector and/or track. The operation of the mechanical and electrical components of the head assembly and disk set are known and well characterized in the art.

With reference again to FIGS. 4 and 5, each head assembly 80 and 84 has associated therewith a controller for controlling the operation of the head assembly. For instance, the illustrated controller 82 generates the necessary control signals for the head assembly 80 in order to implement a selected data operation, such as a read operation or a write operation. The controller 82, in turn, can receive selected command instructions from the control stage 26, and specifically from the system controller 46. Hence, the control signals for initiating a data operation as well as command information for the controller 82 are conveyed along a system bus, such as bus 72, from the control stage 26 to the controller 82. Those of ordinary skill will readily recognize that the controller 82 can include a dedicated microprocessor for controlling the disk drive interface, selected internal logic elements, and a suitable machine program stored in associated memory for use by the microprocessor. Data which is to be written to or read from the hard disk set 90 can be stored in a buffer, as is conventional in the art.

Similarly, the head assembly 84 can employ multiple access arms 210, 212, 214 and 216 which terminate at one end in a series of read/write heads 220, 222, 224, and 226, respectively. The end of the access arms opposite the read/write heads are mechanically fixed or coupled to an actuator 230, which is in turn coupled to a linear or stepper type motor 232. The motor 232 imparts a reciprocating motion to the actuator, which converts this movement into a radial movement for moving the access arms and hence the read/write heads 220–226 to a specific diametrical location of the disk element, as illustrated by arrow 234. Since each of the hard disk elements can be double sided, each disk side has a read/write head associated therewith.

The illustrated read/write heads 220, 222, 224 and 226 write data to the disk storage elements 91, 92, 93 and 94, or read selected data therefrom. As illustrated in the data access and retrieval system 100, each access arm can generally be defined as including a pair of corresponding radial arms that selectively coupled read/write heads to write data to or read data from either side of the disk elements. The illustrated data access and retrieval system 100 reads or writes data to the hard disk set 90 by actuating the spindle motor 104 to position the hard disk at a particular sector and/or track, and the motor 232 is actuated in order to position the read/write heads at a particular sector and/or track. The operation of the head assembly and disk set mechanical and electrical components are known and well characterized in the art.

The head assembly 84 has associated therewith the controller 86 for controlling the operation of the head assembly. The illustrated controller 86 generates control signals for controlling operation of the head assembly 84 in order to implement a selected data operation, such as a read operation or a write operation. The controller 86, in turn, receives selected command instructions from the control stage 26, and specifically from the system controller 46. Hence, the control signals for initiating a data operation as well as command information for the controller 86 are conveyed along a system bus, such as bus 72, from the control stage 26 to the controller 86. Those of ordinary skill will readily recognize that the controller 86 can include a dedicated microprocessor for controlling the disk drive interface, selected internal logic elements, and a suitable machine program stored in associated memory for use by the microprocessor. Data which is to be written to or read from the hard disk set 90 can be stored in a buffer, as is conventional in the art.

In operation, the illustrated image input stage 24 acquires an image of a document, or receives image data through the network interface 30 from a separate or remote installation. The image data associated with the acquired image passes through the processor 40 to the control stage 26. The control stage 26 preferably compresses the image data with a suitable compression section 51 prior to storage onto the main memory 48. The illustrated control stage 26 preferably employs the dual data path data access and retrieval system 100 for writing data to or reading data from the hard disk set 90. According to one practice, multiple head assemblies 80 and 84 and associated controllers 82 and 86, respectively, communicate with a single hard disk set 90. In this configuration, a first set of read/write heads 120, 122, 124, and 126 can write the image data to the hard disk elements, thereby storing the data for subsequent use. The system 100 also allows a different, separate and independently controlled head assembly 84, having an associated set of read/write heads 220, 222, 224, and 226 and controller 86, to perform another selected data operation. For example, as the first set of read/write heads 120–126 are writing data to the disk storage elements 91, 92, 93 and 94, the other set of read/write heads 220–226 can read data from the disks, and vice versa. These data operations can be performed independently of each other, and either contemporaneously or substantially simultaneously relative to each other.

The system 100 further transfers image data from the bus 72 along the data path formed by the controller 82 and the head assembly 80 to the disk set 90. Alternatively, a separate and independent data path is formed between the bus 72 and the disk set 90 by the controller 86 and the head assembly 84. With this arrangement, the illustrated system 100 can access or read image data stored on one or more of the disks 91, 92, 93 and 94, while concomitantly writing data to one or more of these same disks with a separate and independently controlled head assembly.

A significant advantage of the system 100 is that it mechanically and electronically couples multiple head assemblies (e.g., head assemblies 80 and 84) to a single hard disk set 90. The multiple head assemblies further form multiple data pathways between selected system data pathways, such as bus 72, and the system main memory 48 (e.g., hard disk set 90). Moreover, since each head assembly has an associated controller, the system can independently control each head assembly to perform separate data operations. For example, the controller 82 can instruct the head assembly 80 to perform a selected data operation, such as a read operation or a write operation, while the controller 86 can independently instruct head assembly 84 to perform another selected data operation on the same disk set.

Another significant advantage of the system 100 is that it enables an image reproducing system, such as the illustrated electrophotographic printing system 22, to store image data on a relatively low cost storage medium, such as the hard disk set 90. The illustrated system 100 also enables the printing system 22 to access and/or store image data on the hard disk in a manner that does not significantly affect the transfer of new incoming image data. Therefore, the data access and retrieval system 100 employs a relatively low cost storage medium, while concomitantly allowing rapid data handling to and from the hard disk set 90.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. An image reproducing system, comprising:
    image acquisition means for acquiring image data representative of an image of an object,
    a disk storage element for storing the image data,
    a first head assembly disposed so as to perform a selected image data operation relative to a selected portion of said disk storage element, a second head assembly separate from said first head assembly and disposed so as to independently perform a selected image data operation relative to a selected portion of said disk storage element, a first data pathway including said first head assembly and a first controller for communicating said image data to and from said disk storage element, and a second data pathway, separate from said first data pathway, including said second head assembly and a second controller for communicating said image data to and from said disk storage element.

2. The image reproducing system of claim 1, further comprising a first disk controller coupled to said first head assembly for controlling operation thereof, and a second disk controller coupled to said second head assembly for controlling operation thereof.

3. The image reproducing system of claim 1, wherein each said first and second head assembly comprise a plurality of read/write heads, said heads being disposed so as to communicate with at least one side of said disk storage element.

4. The image reproducing system of claim 3, wherein each said first and second head assembly further comprises means for positioning said read/write heads to either read image data from or write image data to said disk storage element.

5. The image reproducing system of claim 1, further comprising a printer module having means for receiving selected data associated with said image data previously stored on said disk storage element for generating a copy of the image.

6. The image reproducing system of claim 1, wherein said image acquisition means comprises a digital scanner for acquiring said image data representative of the image of the object and for digitizing said image data.

7. The image reproducing system of claim 1, wherein said image acquisition means comprises a digital acquisition assembly for acquiring said image data, said assembly including a light source for illuminating a portion of the object, a plurality of photosensitive elements positioned to receive light reflected from the object, said photosensitive elements generating an electrical output signal representative of the image, and a digital converter for converting the electrical output signals into output digital signals, said output digital signals forming said image data.

8. The system according to claim 1, wherein the first head assembly and the second head assembly are configured to operate substantially simultaneously to each other.

9. A dual data pathway image reproducing system for acquiring an image of an object, said image reproduction system comprising:

image acquisition means for acquiring image data representative of an image of an object, a disk storage element, a first head assembly disposed so as to perform a selected image data operation relative to a selected portion of said disk storage element, and a second separate head assembly disposed so as to perform a selected image data operation relative to a selected portion of said disk storage element, wherein said first and second head assemblies are configured for independently performing said image data operation on said disk storage element so as to form multiple separate data paths to and from said disk storage element.

10. The image reproducing system of claim 9, further comprising a first disk controller coupled to said first head assembly for controlling operation thereof, and a second disk controller coupled to said second head assembly for controlling operation thereof.

11. The image reproducing system of claim 9, wherein each said first and second head assembly comprises plurality of read/write heads, said heads being disposed so as to communicate with at least one side of said disk storage element.

12. The image reproducing system of claim 11, further comprising a printer module having means for receiving selected data associated with said image data previously stored on said storage element for generating a copy of the image.

13. The system according to claim 9, wherein the first head assembly and the second head assembly are configured to operate substantially simultaneously to each other.

14. A method for reproducing an image of an object, comprising the steps of:

acquiring image data representative of the image of the object, disposing a first head assembly relative to a disk storage element so as to read or write said image data relative to a selected portion of said disk storage element, disposing a second head assembly separate from said first disk head assembly so as to independently read or write said image data relative to a selected portion of said same disk storage element, communicating said image data to and from said disk storage element along a first data pathway, including said first head assembly and a first controller, and communicating said image data to and from said disk storage element along a second data pathway, including with said second head assembly and a second controller, thereby forming multiple data paths for the transfer of said image data to and from said disk storage element.

15. The method of claim 14, further comprising the steps of controlling operation of said first head assembly with a first disk controller, and controlling operation of said second head assembly with a second disk controller, wherein said first and second disk controllers control the transfer of said image data to and from said disk storage element.

16. The method of claim 14, wherein each said first and second disk assembly comprises a plurality of read/write heads, said heads being disposed so as to communicate with at least one side of each of said one or more storage elements.

17. The method according to claim 14, wherein the steps of communicating along the first pathway and communicating along the second pathway occurs substantially simultaneously.

* * * * *